United States Patent
Michaud et al.

(10) Patent No.: US 10,400,059 B2
(45) Date of Patent: Sep. 3, 2019

(54) HYDROCARBON-BASED POLYMERS BEARING TWO ALKOXYSILANE END GROUPS

(71) Applicant: BOSTIK SA, La Plaine St Denis (FR)

(72) Inventors: Guillaume Michaud, Compiegne (FR); Frederic Simon, Pont l'Eveque (FR); Stephane Fouquay, Mont Saint-Aignan (FR); Abdou Khadri Diallo, Thorigne-Fouillard (FR); Sophie Guillaume, Vitre (FR); Jean-Francois Carpentier, Acigne (FR)

(73) Assignee: BOSTIK SA, La Plaine St Denis (FR)

( * ) Notice: Subject to any disclaimer, the term of this patent is extended or adjusted under 35 U.S.C. 154(b) by 65 days.

(21) Appl. No.: 14/906,681

(22) PCT Filed: Jul. 22, 2014

(86) PCT No.: PCT/FR2014/051896
§ 371 (c)(1),
(2) Date: Jan. 21, 2016

(87) PCT Pub. No.: WO2015/011404
PCT Pub. Date: Jan. 29, 2015

(65) Prior Publication Data
US 2016/0152765 A1    Jun. 2, 2016

(30) Foreign Application Priority Data

Jul. 23, 2013 (FR) .................................... 13 57242

(51) Int. Cl.
| | | |
|---|---|---|
| *C08G 61/08* | (2006.01) | |
| *C08F 10/14* | (2006.01) | |
| *C09J 123/20* | (2006.01) | |
| *C09J 165/00* | (2006.01) | |
| *C09J 5/04* | (2006.01) | |

(52) U.S. Cl.
CPC .............. *C08G 61/08* (2013.01); *C08F 10/14* (2013.01); *C09J 5/04* (2013.01); *C09J 123/20* (2013.01); *C09J 165/00* (2013.01); *C08G 2261/135* (2013.01); *C08G 2261/1644* (2013.01); *C08G 2261/3322* (2013.01); *C08G 2261/418* (2013.01); *C08G 2261/72* (2013.01); *C08G 2261/724* (2013.01); *C08G 2261/76* (2013.01)

(58) Field of Classification Search
None
See application file for complete search history.

(56) References Cited

U.S. PATENT DOCUMENTS

| | | | |
|---|---|---|---|
| 3,857,825 A | 12/1974 | Streck et al. | |
| 5,808,126 A † | 9/1998 | Brzezinska | |
| 6,001,909 A † | 12/1999 | Setiabudi | |
| 6,528,585 B1* | 3/2003 | Standke | C08F 255/02 525/102 |
| 8,101,697 B2* | 1/2012 | Pawlow | C07F 7/1892 525/201 |
| 8,889,806 B2* | 11/2014 | Tsunogae | B60C 1/00 526/126 |
| 2002/0169263 A1† | 11/2002 | Maughon | |
| 2004/0028978 A1* | 2/2004 | Honma | C08J 5/2287 429/492 |
| 2006/0005877 A1* | 1/2006 | Spivack | H01G 9/2031 136/263 |
| 2013/0281590 A1* | 10/2013 | Lin | B60C 1/00 524/262 |

FOREIGN PATENT DOCUMENTS

| | | |
|---|---|---|
| AU | 484924 | 9/1974 |
| CA | 2242060 A1 † | 1/1999 |
| DE | 2344734 A1 † | 3/1975 |

OTHER PUBLICATIONS

International Search report dated Dec. 9, 2014 in corresponding PCT/FR2014/051896 application (pp. 1-2).
K. R. Brzezinska et al., Silicon-Terminated Telechelic Oligomers by Admet Chemistry: Synthesis and Copolymerization, pp. 849-856, Mar. 15, 1999, John Wiley & Sons, Inc., New York, New York, 37 J. Poly. Sci.†
Cezary Pietraszuk et al., Metathesis of Vinyl-Substituted Silicon Compounds with Dienes and Cycloalkenes, pp. 789-793, Aug. 20, 2002, Wiley-VCH Verlag GmbH & Co., Weinheim, Germany, 244 Adv. Synth. Catal.†

* cited by examiner
† cited by third party

*Primary Examiner* — Robert S Loewe
(74) *Attorney, Agent, or Firm* — Millen, White, Zelano and Branigan, P.C.

(57) ABSTRACT

Hydrocarbon-based polymer of formula (1) bearing alkoxysilane end groups:

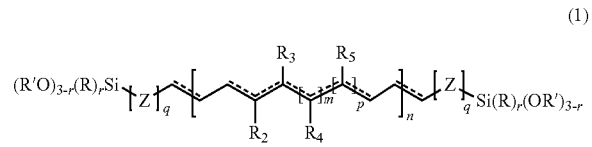

(1)

in which:
⚌ is a double or single bond;
each of $R_2$, $R_3$, $R_4$ and $R_5$ is H, a halo, an alkoxycarbonyl or an alkyl,
m and p are each from 0 to 5,
each of R and R' is an alkyl,
Z is an alkylene, optionally interrupted with COO,
q is 0 or 1,
r is 0, 1 or 2, and
n is an integer such that the number-average molar mass Mn of the polymer is from 400 to 50 000 g/mol, and its polydispersity index (PDI) is from 1.0 to 2.0. Preparation by ring-opening metathesis polymerization for 2 hours to 24 hours. Adhesive composition comprising polymer (1) and crosslinking catalyst. Bonding by assembly of two substrates using this adhesive composition.

16 Claims, No Drawings

HYDROCARBON-BASED POLYMERS BEARING TWO ALKOXYSILANE END GROUPS

The present invention relates to hydrocarbon-based polymers comprising two alkoxysilane end groups, and to the preparation and use thereof.

Modified silane (MS) polymers are known in the field of adhesives. They are used for the assembly by bonding of a wide variety of objects (or substrates). Thus, MS polymers are applied, in combination with a catalyst, in the form of an adhesive layer on at least one of two surfaces belonging to two substrates to be assembled and intended to be placed in contact with each other by assembly. After placing these two substrates in contact and, where appropriate, applying pressure at their tangency surface, the polymer reacts by crosslinking with water of the ambient medium and/or water provided by the substrates, leading to the formation of a cohesive adhesive joint that ensures the solidity of assembly of these two substrates. This adhesive joint is mainly formed from the MS polymer crosslinked as a three-dimensional network formed by the polymer chains linked together via bonds of siloxane type.

However, MS polymers must generally be used in the form of adhesive compositions comprising one or more additives with a reinforcing effect, for instance at least one mineral filler, or alternatively one or more additives directed toward improving the setting time (i.e. the time after which the crosslinking may be considered as complete) or other characteristics such as the rheology or the mechanical performance qualities (elongation, modulus, etc.).

Patent application EP 2 468 783 describes the preparation of a polyurethane bearing polyurethane-polyether and polyurethane-polyester blocks with at least two polyurethane-polyester end blocks linked to an alkoxysilane end group, and also to an adhesive composition comprising this polyurethane and a crosslinking catalyst.

U.S. Pat. No. 6,867,274 describes the possibility of preparing telechelic polymers bearing crosslinkable end groups. Alkoxysilanes are mentioned among the many end groups proposed in said patent. However, said patent does not describe polymers bearing alkoxysilane end groups.

Moreover, patent application CA 2 242 060 describes the possibility of using a composition of adhesive joint type based on polymer containing at least one cycloolefin, a catalyst for the ring-opening metathesis polymerization, a filler and a silane.

However, in practice, said document does not relate to the manufacture of polymers bearing silane end groups. Thus, the sole example describes the manufacture of a polymer by hot (60° C.) mixing over 35 minutes of a composition comprising a catalyst comprising ruthenium, a filler (wollastonite) and three constituents which are thermoplastic polynorbornene, dicyclopentadiene and vinyltrimethoxysilane (VTMS), VTMS is used as adhesion promoter and/or as drying aid. The mole ratio of VTMS to dicyclopentadiene is equal to about 1.16%. The mole ratio of the catalyst to dicyclopentadiene is about 0.08%. The polymer obtained via this synthesis is then crosslinked (cured) at high temperature (stages of 80° C. to 150° C.) for 7 hours.

Due to the cross-polymerization of the three constituents and the presence of polynorbornene, the polymer obtained from this manufacture comprises a multitude of randomly distributed silane end groups.

The aim of the invention is to propose novel polymers bearing alkoxysilane end groups. These polymers may lead, after crosslinking, to the formation of an adhesive joint that has improved mechanical properties, and especially higher cohesion.

Thus, the present invention relates to a hydrocarbon-based polymer comprising two alkoxysilane end groups, said hydrocarbon-based polymer being of formula (1):

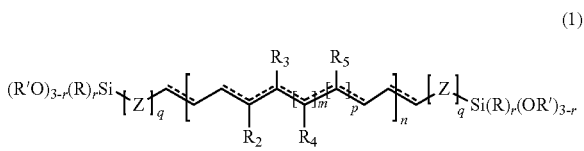

(1)

in which:
each carbon-carbon bond of the chain noted as ⫽ is a double bond or a single bond, in accordance with the valency rules of organic chemistry;
the groups $R_2$, $R_3$, $R_4$ and $R_5$ are each, independently of the other groups or otherwise, a hydrogen, a halo group, an alkoxycarbonyl group or an alkyl group, the groups $R_2$ to $R_5$ possibly being linked together as members of the same saturated or unsaturated ring or heterocycle (i.e. comprising at least one carbon-carbon double bond, including aromatic rings);
m and p are integers each within a range from 0 to 5; preferably from 0 to 2, and even more preferably m and p are both equal to 1, the sum m+p itself being within a range from 0 to 10, preferably from 0 to 6;
R and R', which may be identical or different, each represent a linear or branched, preferably linear, alkyl group comprising from 1 to 4 and preferably from 1 to 2 carbon atoms;
Z is a divalent group chosen from alkylene groups, optionally interrupted with an ester function, and comprising from 1 to 22 and preferably from 1 to 6 carbon atoms;
q is an integer equal to 0 or 1;
r is an integer equal to 0, 1 or 2, and
n is an integer such that the number-average molar mass Mn of the hydrocarbon-based polymer of formula (1) is within a range from 400 to 50 000 g/mol, preferably from 600 to 20 000 g/mol, and the polydispersity index (PDI) of the hydrocarbon-based polymer of formula (1) is within a range from 1.0 to 2.0 and preferably from 1.45 to 1.85.

When m=0, this means that there are no groups between the square brackets to which m applies and that the two carbon-carbon bonds each overlapping one of the square brackets constitute the same carbon-carbon bond. When p=0, this means that there are no groups between the square brackets to which p applies and that the two carbon-carbon bonds each overlapping one of the square brackets constitute the same carbon-carbon bond. When q=0, this means that there are no groups between the square brackets to which q applies and that the two carbon-carbon bonds each overlapping one of the square brackets constitute the same carbon-carbon bond.

Obviously, all the formulae given here are in accordance with the valency rules of organic chemistry.

According to the invention, the term "alkyl group" means a linear or branched, cyclic, acyclic, heterocyclic or polycyclic hydrocarbon-based compound, generally comprising from 1 to 22 and preferably from 1 to 4 carbon atoms. Such an alkyl group generally comprises from 1 to 4 and preferably from 1 to 2 carbon atoms.

According to the invention, the term "halo group" means an iodo, chloro, bromo or fluoro group, preferably chloro.

According to the invention, the term "heterocycle" means a ring which may comprise an atom other than carbon in the chain of the ring, for instance oxygen.

According to the invention, the term "alkylene group interrupted with an ester function" means a linear or branched, saturated or partially unsaturated alkylene (divalent) group, comprising from 1 to 22 and preferably from 1 to 6 carbon atoms, such that a chain of carbon atoms that it comprises may also comprise a divalent —COO— group.

According to the invention, the term "alkoxycarbonyl group" means a linear or branched, saturated or partially unsaturated alkyl (monovalent) group, comprising from 1 to 22 and preferably from 1 to 6 carbon atoms, such that a chain of carbon atoms that it comprises may also comprise a divalent —COO— group.

According to the invention, the term "alkoxysilane group" means a linear or branched, saturated or partially unsaturated alkyl (monovalent) group, comprising from 1 to 4 and preferably from 1 to 2 carbon atoms, such that a chain of carbon atoms that it comprises may also comprise a divalent —Si—O— group.

Preferably, the group of formula —[Z]$_q$—Si(R)$_r$(OR')$_{3-r}$ is chosen from:
- —Si(OCH$_3$)$_3$ (in the case where q=0, r=0 and R' is CH$_3$);
- —SiCH$_3$(OCH$_3$)$_2$ (in the case where q=0, r=1, R is CH$_3$ and R' is CH$_3$);
- —CH$_2$Si(OCH$_3$)$_3$ (in the case where q=1, Z is CH$_2$, r=0 and R' is CH$_3$);
- —CH$_2$SiCH$_3$(OCH$_3$)$_2$ (in the case where q=1, Z is CH$_2$, r=1, R is CH$_3$ and R' is CH$_3$);
- —CO—O—(CH$_2$)$_3$Si(OCH$_3$)$_3$ (in the case where q=1, Z is CO—O—(CH$_2$)3, r=0 and R' is CH$_3$); and
- —CO—O—(CH$_2$)$_3$SiCH$_3$(OCH$_3$)$_2$ (in the case where q=1, Z is CO—O—(CH$_2$)$_3$, r=1, R is CH3 and R' is CH$_3$).

The polydispersity index PDI (or dispersity $D_M$) is defined as the ratio Mw/Mn, i.e. the ratio of the weight-average molar mass to the number-average molar mass of the polymer.

The two average molar masses Mn and Mw are measured according to the invention by size exclusion chromatography (SEC), usually with PEG (polyethylene glycol) or PS (polystyrene) calibration, preferably PS calibration.

The term "end group" means a group located at the chain end (or extremity) of the polymer.

If it is unsaturated, the polymer according to the invention usually comprises a plurality of (i.e. more than two) carbon-carbon double bonds.

In a preferred embodiment, the polymer of formula (1) comprises only one carbon-carbon double bond per repeating unit and the polymer is of formula (1'):

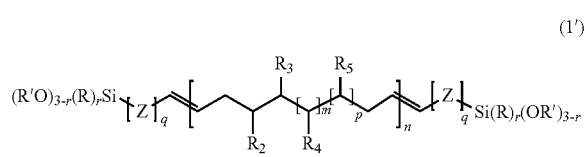

(1')

In this case, preferably, m and p are equal to 1.

Preferably, the invention relates to a hydrocarbon-based polymer comprising two alkoxysilane end groups, said hydrocarbon-based polymer being of formula (2) or of formula (3):

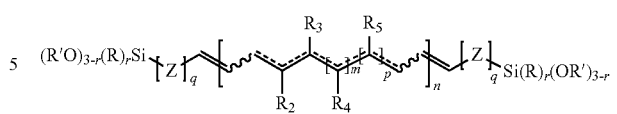

(2)

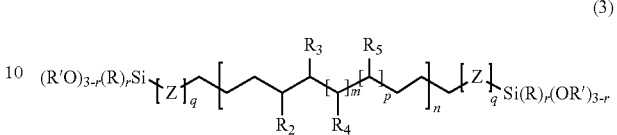

(3)

in which ⌇, m, p, q, r, n, Z, R, R', R$_2$, R$_3$, R$_4$ and R$_5$ have the meanings given above.

As is known to those skilled in the art, the bond ⌇ means that the bond is geometrically oriented on one side or the other relative to the double bond (cis or trans).

Particularly preferably, m is equal to 1 and p is equal to 1. In this case, preferably, q is equal to 0.

Formula (2) illustrates the case in which the repeating unit of the main chain of the polymer of formula (1) is unsaturated and comprises at least one carbon-carbon double bond.

In a preferred embodiment, the polymer of formula (2) comprises only one carbon-carbon double bond per repeating unit [ . . . ]$_n$, and the polymer is of formula (2').

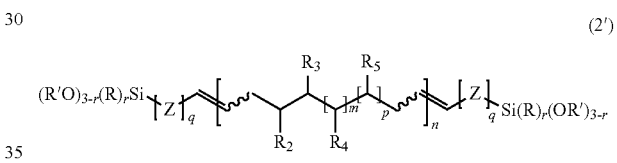

(2')

In this case, preferably, m and p are equal to 1.

Formula (3) illustrates the case in which the main chain of the polymer of formula (1) is saturated.

The polymer of formula (3) may be derived, for example, from the hydrogenation of the polymer of formula (2).

The polymer of formula (2) is generally of trans (E)-trans (E), trans (E)-cis (Z) or cis (Z)-cis (Z) orientation. These three isomers are generally 2.0 obtained in variable proportions, usually with a majority of trans (E)-trans (E). It is possible according to the invention to obtain virtually predominantly the trans (E)-trans (E) isomer.

According to a preferred embodiment of the invention, the invention relates to a hydrocarbon-based polymer comprising two alkoxysilane end groups, said hydrocarbon-based polymer being of formula (4):

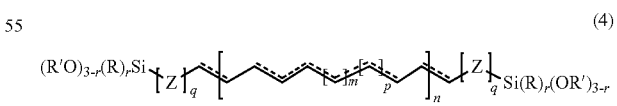

(4)

in which ⌇, m, p, q, r, n, Z, R and R' have the meanings given above.

Formula (4) illustrates the case in which the polymer of formula (1) is such that R$_2$, R$_3$, R$_4$ and R$_5$ are each a hydrogen (H). In a preferred embodiment, the polymer of formula (4) comprises at most only one carbon-carbon double bond per repeating unit [ . . . ]$_n$, and the polymer is of formula (4).

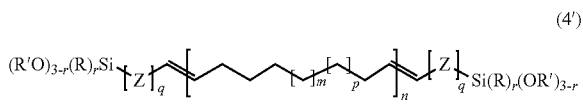
(4')

In this case, preferably, m and p are equal to 1.

Preferably, the group of formula —[Z]$_q$—Si(R)$_r$(OR')$_{3-r}$ is chosen from —Si(OCH$_3$)$_3$; —SiCH$_3$(OCH$_3$)$_2$; —CH$_2$Si(OCH$_3$)$_3$; —CH$_2$SiCH$_3$(OCH$_3$)$_2$; —CO—O—(CH$_2$)$_3$Si(OCH$_3$)$_3$; and —CO—O—(CH$_2$)$_3$SiCH$_3$(OCH$_3$)$_2$).

In a particularly preferred embodiment, the polymer of formula (4) comprises two end groups which result from the use of an alkenylsilane comprising a carbon-carbon double bond, preferably from the use of vinyltrimethoxysilane, allyltrimethoxysilane or 3-(trimethoxysilyl)propyl acrylate as chain-transfer agent (CTA) during the manufacture of the polymer.

According to this embodiment, preferably, the invention relates to a hydrocarbon-based polymer comprising two alkoxysilane end groups, said hydrocarbon-based polymer being of formula (5) or of formula (6):

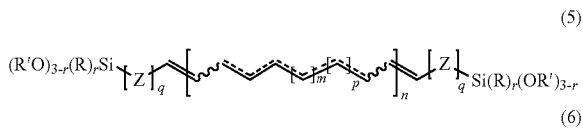
(5)

(6)

in which ⇌, m, p, q, r, n, Z, R and R' have the meanings given above.

Formula (5) illustrates the case in which the repeating unit of the main chain of the polymer of formula (4) is unsaturated and comprises at least one carbon-carbon double bond.

In a preferred embodiment, the polymer of formula (5) comprises only one carbon-carbon double bond per repeating unit [ . . . ]$_n$, and the polymer is of formula (5'). In this case, preferably, m and p are equal to 1.

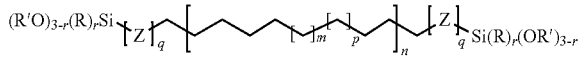
(5')

Formula (6) illustrates the case in which the main chain of the polymer of formula (4) is saturated.

The polymer of formula (6) may be derived, for example, from the hydrogenation of the polymer of formula (5).

Formulae (5) and (6) correspond, respectively, to formulae (2) and (3) in which R$_2$, R$_3$, R$_4$ and R$_5$ are each a hydrogen (H).

Preferably, for each of these two formulae (5) and (6), the group of formula —[Z]$_q$—Si(R)$_r$(OR')$_{3-r}$ is chosen from —Si(OCH$_3$)$_3$; —SiCH$_3$(OCH$_3$)$_2$; —CH$_2$Si(OCH$_3$)$_3$; —CH$_2$SiCH$_3$(OCH$_3$)$_2$; —CO—O—(CH$_2$)$_3$Si(OCH$_3$)$_3$; and —CO—O—(CH$_2$)$_3$SiCH$_3$(OCH$_3$)$_2$).

The polymers of the invention are particularly homogeneous and temperature-stable. They are preferably packaged and stored protected from moisture. The polymers of formula (1), (1'), (2), (2'), (3), (4), (4'), (5), (5') or (6) thus obtained may form, after crosslinking with water of the ambient medium and/or water provided by at least one substrate, generally atmospheric moisture, for example for a relative humidity of air (also known as the degree of hygrometry) usually within a range from 25% to 65%, and in the presence of a suitable catalyst, an adhesive joint that has high cohesion values, in particular greater than 3 MPa. Such cohesion values allow a use as adhesive, for example as sealing joint on a customary support (concrete, glass, marble), in the construction field, or alternatively for bonding glazing in the motor vehicle and naval industries.

Furthermore, the polymers of the invention are polymers that are liquid or solid at room temperature (i.e. about 20° C.).

When these polymers are solid, they are generally thermoplastic (in anhydrous medium), i.e. hot-deformable (i.e. at a temperature above room temperature). They may thus be used as hot-melt adhesives and applied hot at the interface of substrates to be assembled at their tangency surface. On solidification at room temperature, an adhesive joint which solidly unites the substrates is thus immediately created, thus giving the adhesive advantageous properties in terms of reduced setting time.

When these polymers are liquid, as they are capable of crosslinking in the presence of moisture at room temperature in the liquid state, the adhesive composition which comprises them also generally comprises at least one filler.

The invention also relates to a process for preparing at least one hydrocarbon-based polymer bearing alkoxysilane end groups according to the invention, said process comprising at least one step of ring-opening metathesis polymerization, in the presence of:

- at least one metathesis catalyst, preferably a catalyst comprising ruthenium, even more preferably a Grubbs catalyst,
- at least one chain-transfer agent (CTA) chosen from the group formed by alkenylsilanes bearing a carbon-carbon double bond, preferably from the group formed by vinyltrimethoxysilane, allyltrimethoxysilane and 3-(trimethoxysilyl)propyl acrylate, and
- at least one compound chosen from compounds comprising at least one hydrocarbon-based ring and generally from 6 to 16 and preferably from 6 to 12 carbon atoms per ring, said ring comprising at least one carbon-carbon double bond, and substituted derivatives of this compound, said compound generally being of formula (7):

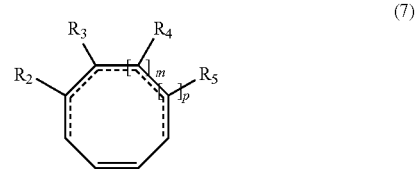
(7)

in which m, p, R$_2$, R$_3$, R$_4$ and R$_5$ have the meanings given above, said step being performed for a time of between 2 hours and 24 hours (limits inclusive).

The reaction time is preferably between 2 hours and 12 hours (limits inclusive).

The mole ratio of the CTA to the compound comprising at least one hydrocarbon-based group is generally within a range from 1 to 10 mol % and preferably from 5 to 10 mol %.

According to the invention, the term "alkenylsilane comprising a carbon-carbon double bond" means a compound of formula $H_2C=CH-(CH_2)_zSi(R^1)_t(R^2)_u(OR^3)_{3-t-u}$ in which z is from 0 to 10 and $R^1$, $R^2$ and $R^3$ are, independently of each other, a saturated, linear or branched alkyl group comprising from 1 to 4 and preferably from 1 to 2 carbon atoms and t=0, 1 or 2, and u=0, 1 or 2, with t+u<3.

In general, the compounds are chosen from compounds comprising at least one hydrocarbon-based ring and generally from 6 to 16 and preferably from 6 to 12 carbon atoms per ring, said ring comprising at least one carbon-carbon double bond. The ring chain is preferably formed from carbon atoms, but at least one carbon atom may be replaced with another atom such as oxygen. The substituted derivatives of these compounds comprise derivatives comprising at least a second ring comprising at least one carbon-carbon bond in common with the first ring.

The compounds of formula (7) are substituted or unsubstituted. According to the invention, the term "substitution" means the presence of a group, generally replacing a hydrogen, the substitution being of alkyl, cyclic or acyclic, alkoxycarbonyl or halo type, and the substitution preferably being located alpha, beta, gamma or delta to the carbon-carbon double bond, even more preferably gamma or delta to the carbon-carbon double bond.

In a preferred embodiment of the invention, these compounds are not substituted, i.e. $R_2=R_3=R_4=R_5=H$.

In a preferred embodiment of the invention, which may or may not be independent of the preceding embodiment, m=p=1.

In a preferred embodiment of the invention, which may or may not be independent of the preceding embodiments, the chain-transfer agent has the formula $CH_2=CH-[Z]_q-Si(R)_r(OR')_{3-r}$, in which Z, R, R', q and r have the meanings given above.

Preferably, the chain-transfer agent (CTA) is chosen from: $CH_2=CH-Si(OCH_3)_3$; $CH_2=CH-SiCH_3(OCH_3)_2$; $CH_2=CH-CH_2Si(OCH_3)_3$; $CH_2=CH-CH_2SiCH_3(OCH_3)_2$; $CH_2=CH-CO-O-(CH_2)_3Si(OCH_3)_3$; and $CH_2=CH-CO-O-(CH_2)_3SiCH_3(OCH_3)_2$.

Ring-opening metathesis polymerization is a reaction that is well known to those skilled in the art, which is performed here in the presence of vinyltrimethoxysilane, allyltrimethoxysilane or 3-(trimethoxysilyl)propyl acrylate.

Vinyltrimethoxysilane (or (trimethoxysilyl)ethylene or ethenyl tri methoxysilane) (product of CAS No. 2768-02-7), allyltrimethoxysilane (product of CAS No. 2551-83-9) and 3-(trimethoxysilyl)propyl acrylate (product of CAS No. 4369-14-6) are commercially available products.

The cyclic compounds of formula (7) are preferably chosen according to the invention from the group formed by cycloheptene, cyclooctene, cyclononene, cyclodecene, cycloundecene, cyclododecene, 1,5-cyclooctadiene, cyclononadiene, 1,5,9-cyclodecatriene, and also norbornene, norbornadiene, dicyclopentadiene, 7-oxanorbornene and 7-oxanorbornadiene, having the respective formulae:

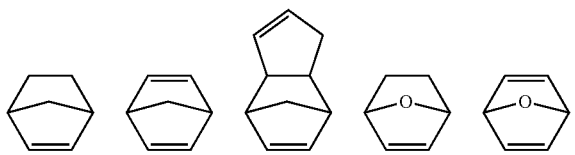

Cyclooctene (COE) and 1,5-cyclooctadiene (COD) are most particularly preferred.

Mention may also be made of substituted derivatives of these cyclic compounds, such as, preferably, alkyl-cyclooctenes, alkyl-cyclooctadienes, halocycloalkenes and alkylcarbonylcycloalkenes. In such a case, the alkyl, halo and alkoxycarbonyl groups have the meanings given above. The alkyl groups are usually beta, gamma or delta to the carbon-carbon double bond and even more preferably gamma or delta to the carbon-carbon double bond.

The ring-opening metathesis polymerization step is usually performed in the presence of at least one solvent, generally chosen from the group formed by the aqueous, organic or protic solvents typically used in polymerization reactions and which are inert under the polymerization conditions, such as aromatic hydrocarbons, chlorohydrocarbons, ethers, aliphatic hydrocarbons, alcohols and water, or mixtures thereof. A preferred solvent is chosen from the group formed by benzene, toluene, para-xylene, methylene chloride, dichloroethane, dichlorobenzene, chlorobenzene, tetrahydrofuran, diethyl ether, pentane, hexane, heptane, methanol, ethanol and water, or mixtures thereof. Even more preferably, the solvent is chosen from the group formed by benzene, toluene, para-xylene, methylene chloride, dichloroethane, dichlorobenzene, chlorobenzene, tetrahydrofuran, diethyl ether, pentane, hexane, heptane, methanol and ethanol, or mixtures thereof. Even more particularly preferably, the solvent is toluene, hexane, heptane, or a mixture of toluene and methylene chloride. The solubility of the polymer formed during the polymerization reaction generally and mainly depends on the choice of the solvent and on the molar weight of the polymer obtained. It is also possible for the reaction to be performed without solvent.

The metathesis catalyst, for instance a Grubbs catalyst, is generally a commercial product.

The metathesis catalyst is usually a transition metal catalyst, especially among which is a catalyst comprising ruthenium, usually in the form of ruthenium complex(es) such as ruthenium carbene. Use may thus be made particularly preferably of Grubbs catalysts. According to the invention, the term "Grubbs catalyst" generally means a first or second generation Grubbs catalyst, but also any other catalyst of Grubbs type (comprising ruthenium-carbene) that is available to a person skilled in the art, for instance the substituted Grubbs catalysts described in patent U.S. Pat. No. 5,849,851.

A first-generation Grubbs catalyst is generally of formula (8):

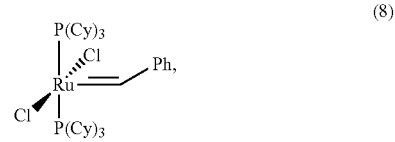

in which Ph is phenyl and Cy is cyclohexyl.

The group $P(Cy)_3$ is a tricyclohexylphosphine group.

The IUPAC name of this compound is: benzylidenebis(tricyclohexylphosphine)dichlororuthenium (of CAS No. 172222-30-9).

A second-generation Grubbs catalyst is generally of formula (9):

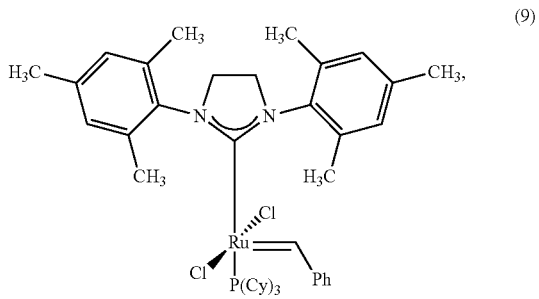

in which Ph is phenyl and Cy is cyclohexyl.

The IUPAC name of this second-generation catalyst is benzylidene[1,3-bis(2,4,6-trimethylphenyl)-2-imidazolidinylidene]-dichloro(tricyclohexylphosphine)ruthenium (of CAS No. 246047-72-3).

The process for preparing a hydrocarbon-based polymer according to the invention may also comprise at least one additional step of hydrogenation of double bonds. Obviously, this step is performed only if the hydrocarbon-based polymer of formula (1) according to the invention is unsaturated, i.e. if it is in particular a polymer of formula (2), (2'), (5) or (5'). Hydrogenation of at least one double bond and preferably total or partial hydrogenation of the double bonds is thus performed.

This step is generally performed by catalytic hydrogenation, usually under hydrogen pressure and in the presence of a hydrogenation catalyst such as a palladium catalyst supported on charcoal (Pd/C). It more particularly allows the formation of a compound of formula (3) (or, respectively, (6)) from a compound of formula (2) or (2') (or, respectively, (5) or (5')).

The invention also relates to an adhesive composition comprising a polymer according to the invention and from 0.01% to 3% by weight and preferably from 0.1% to 1% by weight of a crosslinking catalyst. The polymer according to the invention is a polymer of formula (1), (1'), (2), (2'), (3), (4), (4'), (5), (5') or (6).

The crosslinking catalyst may be used in the composition according to the invention and may be any catalyst known to those skilled in the art for silanol condensation. Examples of such catalysts that may be mentioned include:

organotitanium derivatives such as titanium acetylacetonate (commercially available under the name TYZORR® AA75 from the company Dupont);
organoaluminum derivatives such as aluminum chelate (commercially available under the name K-KAT® 5218 from the company King Industries);
organotin derivatives such as dibutyltin dilaurate (or DBTL); and
amines, such as 1,8-diazobicyclo(5.4.0)undec-7-ene or DBU.

UV stabilizers such as amines or antioxidants may also be included in the composition according to the invention.

The antioxidants may comprise primary antioxidants that trap free radicals and that are generally substituted phenols such as Irganox® 1010 from Ciba. The primary antioxidants may be used alone or in combination with other antioxidants such as phosphites, for instance Irgafos® 168 from Ciba.

According to a particularly preferred embodiment, the adhesive composition according to the invention is packaged in airtight packaging prior to its final use, so as to protect it from ambient moisture. Such packaging may advantageously be formed from a multilayer sheet which typically comprises at least one layer of aluminum and/or at least one layer of high-density polyethylene. For example, the packaging is formed from a layer of polyethylene coated with an aluminum foil. Such a packaging may in particular be in the form of a cylindrical cartridge.

Finally, the invention relates to a process for bonding by assembly of two substrates, comprising:

the coating of an adhesive composition as defined previously, in liquid form, preferably in the form of a layer with a thickness in a range from 0.3 to 5 mm, preferably between 1 and 3 mm, onto at least one of the two surfaces that belong, respectively, to the two substrates to be assembled, and which are intended to be placed in contact with each other on a tangency surface; and then the effective placing in contact of the two substrates on their tangency surface.

The adhesive composition in liquid form is either the (naturally) liquid adhesive composition or the melted adhesive composition.

Needless to say, the coating and the placing in contact must be performed within a compatible time interval, as is well known to those skilled in the art, i.e. before the adhesive layer applied to the substrate loses its capacity to fix by bonding this substrate to another substrate. In general, the crosslinking of the polymer of the adhesive composition, in the presence of the catalyst and water from the ambient medium and/or water provided by at least one of the substrates, begins to take place during the coating, and then continues to take place during the step of placing of the two substrates in contact. In practice, the water generally results from the relative humidity of the air.

The suitable substrates are, for example, inorganic substrates such as glass, ceramics, concrete, metals or alloys (such as aluminum alloys, steel, non-ferrous metals and galvanized metals); or organic substrates such as wood, plastics such as PVC, polycarbonate, PMMA, polyethylene, polypropylene, polyesters, epoxy resins; metal substrates and composites coated with paint (as in the motor vehicle field).

The invention will be understood more clearly in the light of the examples that follow.

EXAMPLES

The examples that follow illustrate the invention without, however, limiting its scope.

The synthetic reactions of the examples were performed in one or two steps, with an optional step of synthesis of the transfer agent and a step of ring-opening polymerization of cyclooctene in the presence of a Grubbs catalyst and a transfer agent. The transfer agent was a commercial product or a product synthesized specially for this use.

The general scheme of the polymerization reactions of the examples is given below, and will be explained on a case by case basis in the examples.

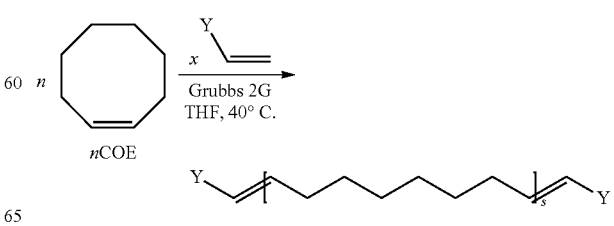

Herein, CTA is the chain-transfer agent, COE is cyclooctene, 2G Grubbs is the catalyst of formula (9) and Y (equal to —[Z]$_q$—Si(R)(OR')$_{3-r}$) is chosen from the group formed by —Si(OCH$_3$)$_3$ (in the case where the CTA is vinyltrimethoxysilane), —CH$_2$Si(OCH$_3$)$_3$ (in the case where the CTA is allyltrimethoxysilane) and —COO(CH$_2$)$_3$Si(OCH$_3$)$_3$ (in the case where the CTA is 3-(trimethoxysilyl)propyl acrylate); x is the number of moles of CTA; n is the number of moles of COE, and s is the repetition number of the monomer unit in the polymer.

In any event, "s" is a number less than or equal to "n", preferably equal to n.

The reaction could last from 2 hours to 24 hours.

Experimental Protocol

All the experiments were performed, if necessary, under an argon atmosphere.

All the reagents (cyclooctene (COE), the second-generation Grubbs (or 2G Grubbs) catalyst of formula (9), vinyltrimethoxysilane, allyltrimethoxysilane and 3-(trimethoxysilyl)propyl acrylate) were products from the company Sigma-Aldrich.

Cyclooctene (COE) was degassed a first time, then dried over CaH$_2$ and finally distilled before use.

All the other products were used as received.

The DSC (differential scanning calorimetry) analyses were performed using aluminum capsules, on a Setaram DSC 131 machine calibrated with indium, at a rate of 10° C./min and under a continuous stream of helium (at 25 mL/min).

The NMR spectra were recorded on Bruker AM-500 and Bruker AM-400 spectrometers, at 298 K in CDCl$_3$. The chemical shifts were referenced relative to tetramethylsilane (TMS) using the proton ($^1$H) or carbon ($^{13}$C) resonance of the deuterated solvent. The chemical shift of $^{29}$Si was referenced relative to TMS.

The number-average and weight-average molar masses (M$_n$ and M$_w$) and the polydispersity index PDI (M$_w$/M$_n$) of the polymers were determined by size exclusion chromatography (SEC), with polystyrene calibration, using a Polymer Laboratories PL-GPC 50 instrument. The samples were eluted with tetrahydrofuran (THF) (product from the company Sigma-Aldrich) at 30° C. and at 1.0 mL/min. The mass spectra were recorded with an AutoFlex LT high-resolution spectrometer (Bruker) equipped with an N$_2$ pulsed laser source (337 nm, 4 ns pulse width).

General Polymerization Procedure

All the polymerizations were performed in a similar manner. The only differences concerned the nature and the initial concentration of the chain-transfer agent (CTA).

A typical procedure here is described below. It corresponds to test No. 2 of Table 1 (Example 1).

The monomer COE (1.4 mL, 10.8 mmol) and dry CH$_2$Cl$_2$ (5 mL) were placed in a 100 mL round-bottomed flask into which was also placed a Teflon®-coated magnetic stirring bar. The flask and its contents were then placed under argon. CTA, in this case vinyltrimethoxysilane (82.7 µL, 0.54 mmol), was then introduced into the flask by syringe. The flask was immersed in an oil bath at 40° C. immediately after the addition, via a cannula, of the G2 catalyst (5.0 mg, 5° µmol) dissolved in CH$_2$Cl$_2$ (2 mL). The reaction mixture became very viscous within two minutes. The viscosity then decreased slowly over the following 10 minutes. After 24 hours, counting from the addition of the catalyst, the product present in the flask was extracted after concentrating the solvent under vacuum. A product was then recovered after precipitation from methanol (which made it possible to recover the catalyst in the filtrate), filtration and drying under vacuum (94% yield in this case). The analysis made it possible to demonstrate that the product was indeed the polymer having the expected formula.

All the polymers prepared in the examples were recovered as colorless solid powders, readily soluble in chloroform and insoluble in methanol.

Example 1: Synthesis of a Polymer Comprising Two Alkoxysilane End Groups Starting with Cyclooctene (COE) and Vinyltrimethoxysilane The reaction was performed according to scheme 2 below:

Scheme 2

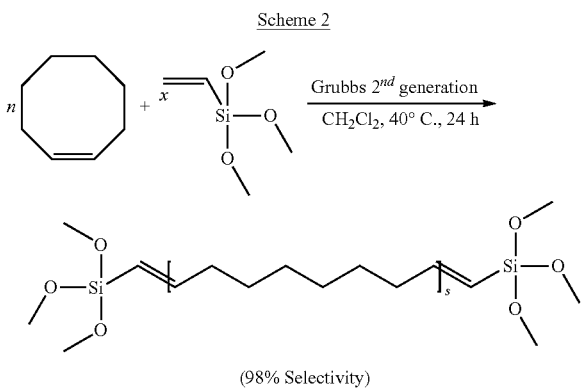

(98% Selectivity)

The expected polymer was thus synthesized. It had a melting point of 57° C.

Various tests were performed according to this reaction. They are collated in Table 1 below.

TABLE 1

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 1 | 2000:200:1 | 100 | 5500 | 1.59 |
| 2 | 2000:100:1 | 100 | 7000 | 1.65 |
| 3 | 2000:50:1 | 100 | 14400 | 1.83 |
| 4 | 2000:20:1 | 100 | 51700 | 1.85 | in which CTA = vinyltrimethoxysilane and [X]$_0$ = initial concentration of X
[a] the polymerization was performed under the following particular conditions: 5 µmol of catalyst (G2), 7 mL of CH$_2$Cl$_2$, temperature of 40° C., time 24 hours
[b] the Mn$_{SEC}$ values were determined by SEC in THF at 30° C.

NMR analyses of the polymer obtained in test No. 2 gave the following values, which confirmed the structural formula of the polymer:
$^1$H NMR (CDCl$_3$, 400 MHz, 298K) – δ$_{ppm}$: 5.39; 1.97, 1.30; end groups: 6.43-6.47 (m, 2H, —CH=CH—Si), 5.39 (m, 2H, —CH=CH—Si), 3.57 (s, 18H, —(CH$_3$O)$_3$Si).
$^{13}$C NMR ($^1$H) (CDCl$_3$, 100 MHz, 298K) – δ$_{ppm}$: 130.2 (trans) 129.6 (cis), 36.6, 32.6, 29.1, 27.2); end groups: 154.9 (—CH=CH—Si), 117.1 (—CH=CH—Si), 50.7 (—(CH$_3$O)$_3$Si).

Example 2: Synthesis of a Polymer Comprising Two Alkoxysilane End Groups Starting with Cyclooctene (COE) and Allyltrimethoxysilane The reaction was performed according to scheme 3 below:

Scheme 3

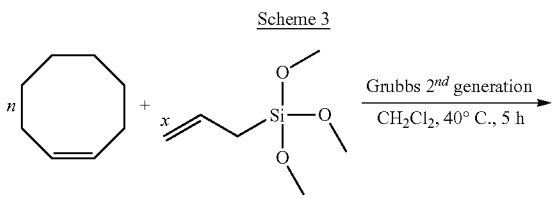

-continued

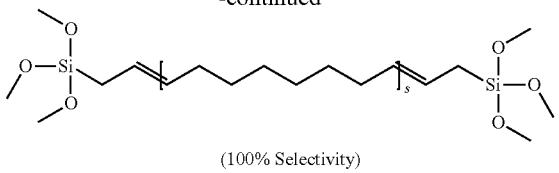

(100% Selectivity)

The expected polymer was thus synthesized. It had a melting point of 54° C.

Various tests were performed according to this reaction. They are collated in Table 2 below.

TABLE 2

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 5 | 2000:200:1 | 100 | 5500 | 1.59 |
| 6 | 2000:100:1 | 100 | 7000 | 1.65 |
| 7 | 2000:50:1 | 100 | 14400 | 1.83 |
| 8 | 2000:20:1 | 100 | 51700 | 1.85 | in which CTA = allytrimethoxysilane and [X]$_0$ = initial concentration of X
[a] the polymerization was performed under the following particular conditions: 5 μmol of catalyst (G2), 7 mL of CH$_2$Cl$_2$, temperature of 40° C., time 5 hours
[b] the Mn$_{SEC}$ values were determined by SEC in THF at 30° C.
NMR analyses of the polymer obtained in test No. 6 gave the following values, which confirmed the structural formula of the polymer:
$^1$H NMR (CDCl$_3$, 400 MHz, 298K) – δ$_{ppm}$: 5.38; 5.35, 2.02, 1.97, 1.33; end groups: 5.38-5.35 (m, 4H, —CH═CH—Si), 3.57 (s, 18H, —(CH$_3$O)$_3$Si), 1.64-1.55 (m, 4H, —CH$_2$—Si).
$^{13}$C NMR ($^1$H) (CDCl$_3$, 100 MHz, 298K) – δ$_{ppm}$: 130.3 (trans) 129.8 (cis), 32.6, 29.7, 29.1, 27.2; end groups: 129.9-130.3 (—CH═CH—CH$_2$—Si), 122.6 (—CH═CH—CH$_2$—Si); 50.7 (—(CH$_3$O)$_3$Si), 15.1 (—CH$_2$—Si).
DSC analysis of the polymer obtained in test No. 6 (performed in first sequence, from −60° C. to 80° C., at 10° C./min) gave the following values for the polymer: crystallization temperature T$_c$ = 45.0° C. and melting point T$_m$ = 54.6° C..

Example 3: Synthesis of a Polymer Comprising Two Alkoxysilane End Groups Starting with Cyclooctene (COE) and 3-(trimethoxysilyl)propyl acrylate The reaction was performed according to scheme 4 below:

TABLE 3

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 9 | 2000:200:1 | 100 | 3700 | 1.43 |
| 10 | 2000:100:1 | 100 | 7100 | 1.70 |
| 11 | 2000:50:1 | 100 | 11600 | 1.80 |
| 12 | 2000:20:1 | 100 | 34100 | 1.68 | in which CTA = 3-(trimethoxysilyl)propyl acrylate and [X]$_0$ = initial concentration of X
[a] the polymerization was performed under the following particular conditions: 5 μmol of catalyst (G2), 7 mL of CH$_2$Cl$_2$, temperature of 40° C., time 5 hours
[b] the Mn$_{SEC}$ values were determined by SEC in THF at 30° C.
NMR analyses of the polymer obtained in test No. 10 gave the following values, which confirmed the structural formula of the polymer:
$^1$H NMR (CDCl$_3$, 400 MHz, 298K) – δ$_{ppm}$: 5.38; 5.35, 2.01, 1.97, 1.31; end groups: 5.38-5.35 (m, 2H, —CH$_2$═C—Si), 3.57 (s, 18H, —(CH$_3$O)$_3$Si), 1.64-1.55 (m, 4H, —CH$_2$—Si).
$^{13}$C NMR ($^1$H) (CDCl$_3$, 100 MHz, 298K) – δ$_{ppm}$: 130.3 (trans) 129.8 (cis), 32.6, 29.7, 29.1, 27.2; end groups: 129.9-130.3 (—CH═CH—CH$_2$—Si), 122.6 (—CH═CH—CH$_2$—Si), 50.7 (—(CH$_3$O)$_3$Si), 15.1 (—CH$_2$—Si).
$^{29}$Si NMR (59 MHz, CDCl$_3$, 298K) δ$_{ppm}$: −42.4 (—Si(OCH$_3$)$_3$).
DSC analysis of the polymer obtained in test No. 6 (performed in first sequence, from −60° C. to 80° C., at 10° C./min) gave the following values for the polymer: crystallization temperature T$_c$ = 45.0° C. and melting point T$_m$ = 54.6° C..

Example 4: Synthesis of an Adhesive Composition from a Polymer Comprising Two Alkoxysilane End Groups of Example 1

An adhesive composition was prepared comprising 0.20% by weight of a crosslinking catalyst formed from dioctyltin dineodecanoate (product Tib kat 223 from the company Tib Chemicals) and the polymer according to the invention obtained in Example 1, by mixing.

The mixture thus obtained was stirred reduced (20 mbar, i.e. 2000 Pa) for 15 minutes before the composition thus obtained was packaged in an aluminum cartridge.

Measurement of the breaking strength and the elongation at break by tensile testing was performed according to the protocol described below.

The measurement principle consists in drawing in a tensile testing machine, the mobile jaw of which moves at a constant speed equal to 100 mm/minute, a standard specimen formed from the crosslinked adhesive composition and in recording, at the time when the specimen breaks, the applied tensile stress (in MPa) and the elongation of the specimen (in %).

Scheme 4

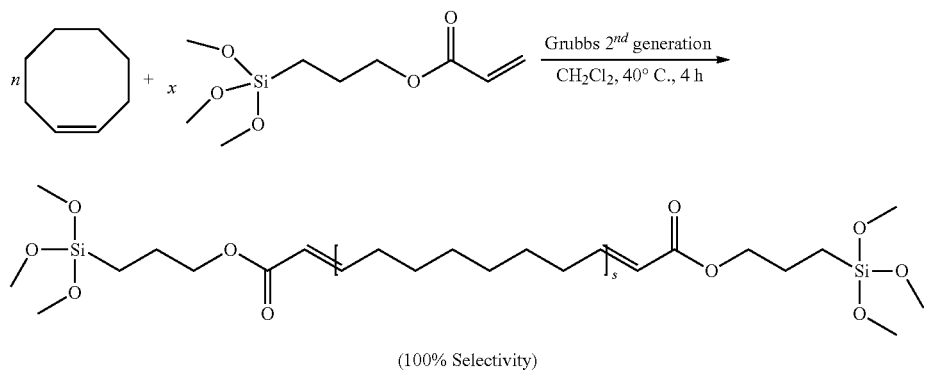

(100% Selectivity)

The expected polymer was thus synthesized. It had a melting point of 59° C.

Various tests were performed according to this reaction. They are collated in Table 3 below.

The standard specimen is dumbbell-shaped, as illustrated in international standard ISO 37. The narrow part of the dumbbell used has a length of 20 mm, a width of 4 mm and a thickness of 500 μm.

To prepare the dumbbell, the composition packaged as described previously was heated to 100° C., and the amount required to form a film with a thickness of 300 μm on an A4 sheet of silicone paper was then extruded thereon and left for 7 days at 23° C. and 50% relative humidity for crosslinking. The dumbbell is then obtained by simply cutting out from the crosslinked film.

The dumbbell of the adhesive composition then has a breaking stress of 8 MPa with an elongation at break of 10%. This test is repeated twice and gives the same result.

The adhesive composition was then subjected to tests of bonding of two strips of wood (each 20 mm×20 mm×2 mm in size) to give, after crosslinking for 7 days at 23° C., a breaking force of 2 MPa in adhesive rupture.

The invention claimed is:

1. A hydrocarbon-based polymer comprising two alkoxysilane end groups, said hydrocarbon-based polymer being of formula (1):

(1)

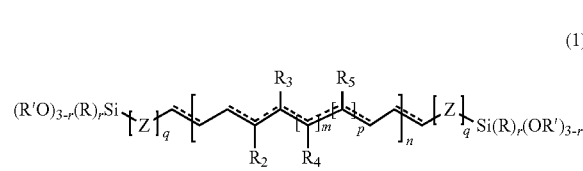

in which:
  each carbon-carbon bond of the chain noted as ⌇ is a double bond or a single bond, in accordance with the valency rules of organic chemistry;
  the groups $R_2$, $R_3$, $R_4$ and $R_5$ are each, independently of the other groups or otherwise, a hydrogen, a halo group, an alkoxycarbonyl group or an alkyl group, the groups $R_2$ to $R_5$ possibly being linked together as members of the same saturated or unsaturated ring or heterocycle,
  m and p are integers each within a range from 0 to 5, the sum m+p itself being within a range from 0 to 10,
  R and R', which may be identical or different, each represent a linear or branched, preferably linear, alkyl group comprising from 1 to 4,
  Z is a divalent alkylene group, interrupted with an ester function, and having from 1 to 22 carbon atoms,
  q is 1,
  r is an integer equal to 0 or 1, and
  n is an integer such that the number-average molar mass Mn of the hydrocarbon-based polymer of formula (1) is within a range from 400 to 50 000 g/mol, and the polydispersity index (PDI) of the hydrocarbon-based polymer of formula (1) is within a range from 1.0 to 2.0.

2. The hydrocarbon-based polymer comprising two alkoxysilane end groups as claimed in claim 1, said polymer being such that the group of formula —[Z]$_q$—Si(R)$_r$(OR')$_{3-r}$ is —CO—O—(CH$_2$)$_3$Si(OCH$_3$)$_3$); or —CO—O—(CH$_2$)$_3$SiCH$_3$(OCH$_3$)$_2$).

3. The hydrocarbon-based polymer comprising two alkoxysilane end groups as claimed in claim 1, said polymer being of formula (1'):

(1')

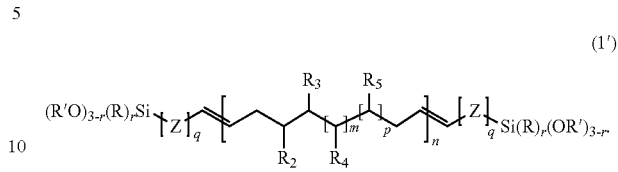

4. The hydrocarbon-based polymer comprising two alkoxysilane end groups as claimed in claim 1, said hydrocarbon-based polymer being of formula (2) or of formula (3):

(2)

(3)

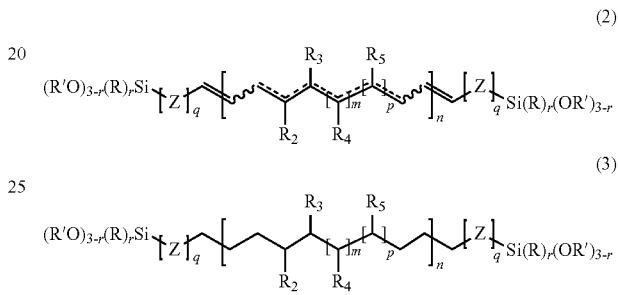

in which the bond ⌇ means that the bond is geometrically oriented on one side or the other relative to the double bond (cis or trans).

5. The hydrocarbon-based polymer comprising two alkoxysilane end groups as claimed in claim 1, said hydrocarbon-based polymer being of formula (4):

(4)

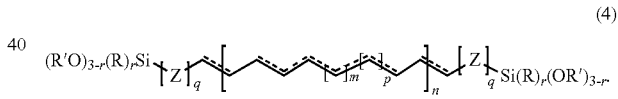

6. The hydrocarbon-based polymer comprising two alkoxysilane end groups as claimed in claim 5, said polymer being of formula (4'):

(4')

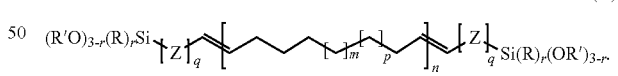

7. The hydrocarbon-based polymer comprising two alkoxysilane end groups as claimed in claim 5, said hydrocarbon-based polymer being of formula (5) or of formula (6):

(5)

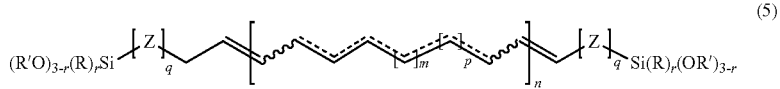

(6)

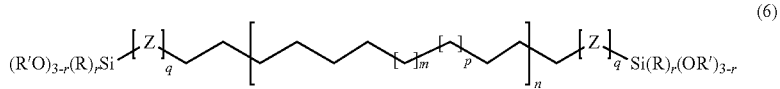

in which the bond ⌇ means that the bond is geometrically oriented on one side or the other relative to the double bond (cis or trans).

8. A process for preparing at least one hydrocarbon-based polymer as claimed claim 1, said process comprising at least one step of ring-opening metathesis polymerization in the presence of:
- at least one metathesis catalyst,
- at least one chain-transfer agent (CTA) chosen from the group formed by alkenylsilanes bearing a carbon-carbon double bond, and
- at least one compound comprising at least one hydrocarbon-based ring and from 6 to 16 carbon atoms per ring, said ring comprising at least one carbon-carbon double bond, or substituted derivatives of this compound, said compound being of formula (7):

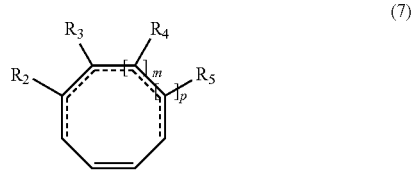

(7)

in which:
- each carbon-carbon bond of the chain noted as ⌇ is a double bond or a single bond, in accordance with the valency rules of organic chemistry;
- the groups $R_2$, $R_3$, $R_4$ and $R_5$ are each, independently of the other groups or otherwise, a hydrogen, a halo group, an alkoxycarbonyl group or an alkyl group, the groups $R_2$ to $R_5$ possibly being linked together as members of the same saturated or unsaturated ring or heterocycle,
- m and p are integers each within a range from 0 to 5, the sum m+p itself being within a range from 0 to 10,
- said step being performed for a time of between 2 hours and 24 hours, (limits inclusive).

9. The preparation process as claimed in claim 8, such that the chain-transfer agent has the formula $CH_2=CH-[Z]_q-Si(R)_r(OR')_{3-r}$ in which:
- R and R', which may be identical or different, each represent a linear or branched alkyl group comprising from 1 to 4 carbon atom,
- Z is a divalent alkylene group interrupted with an ester function, and comprising from 1 to 22 carbon atoms,
- q is an integer equal to 0 or 1, and
- r is an integer equal to 0 or 1.

10. The preparation process as claimed in claim 8, such that the chain-transfer agent is: $CH_2=CH-CO-O-(CH_2)_3Si(OCH_3)_3$; or $CH_2=CH-CO-O-(CH_2)_3SiCH_3(OCH_3)_2$.

11. The preparation process as claimed in claim 8, said process being such that the mole ratio of the CTA to the compound comprising at least one hydrocarbon-based ring is within a range from 1 to 10 mol %.

12. The preparation process as claimed in claim 8, said process also comprising at least one additional hydrogenation of double bonds.

13. The preparation process as claimed in claim 12, such that the additional hydrogenation is performed by catalytic hydrogenation, under hydrogen pressure and in the presence of a hydrogenation catalyst.

14. The process according to claim 8, wherein the CTA is 3-(trimethoxysilyl)propyl acrylate.

15. An adhesive composition comprising at least one polymer as claimed in claim 1 and from 0.01% to 3% by weight of at least one crosslinking catalyst.

16. A process for bonding by assembly of two substrates, comprising:
- the coating of an adhesive composition as claimed in claim 15, in liquid form, optionally in the form of a layer with a thickness in a range from 0.3 to 5 mm, onto at least one of the two surfaces that belong, respectively, to the two substrates to be assembled, and which are intended to be placed in contact with each other on a tangency surface; and then
- effective placing in contact of the two substrates on their tangency surface.

* * * * *